Inventor
Toshihiro Fujimoto by Hill, Sherman, Meroni, Gross & Simpson Attnys.

Inventor
Toshihiro Fujimoto by Hill, Sherman, Meroni, Gross & Simpson Attys.

Inventor
Toshihiro Fujimoto by Hill, Sherman, Meroni, Gross & Simpson, Attnys.

Inventor
Toshihiro Fujimoto by Hill, Sherman, Meroni, Gross & Simpson Attys.

United States Patent Office 3,360,735

Patented Dec. 26, 1967

3,360,735

AUTOMATIC GAIN CONTROL CIRCUIT HAVING MEANS FOR COMPENSATING FOR CAPACITIVE EFFECT

Toshihiro Fujimoto, Funabashi-shi, Japan, assignor to Sony Corporation, Tokyo, Japan, a corporation of Japan Filed July 17, 1964, Ser. No. 383,289
Claims priority, application Japan, July 17, 1963, 38/38,723
2 Claims. (Cl. 330—27)

This invention relates generally to an improved automatic gain control (AGC) circuit and more particularly to a transistorized AGC circuit for television receivers or radio receivers.

Automatic gain control circuits which operate in a high frequency range, for instance in the order of 25 megacycles (mc.), particularly those employing transistors, have inherent in their structures capacitances which adversely affect the controlling action on the input signal. These capacitive effects are practically negligible at lower frequency levels, and therefore do not adversely affect the controlling operation. However, at the higher frequency levels, these capacitive effects can impair the controlling operation to the extent that no control can be exercised over the attenuation of the input signal to a succeeding stage. Therefore, if it is desired to employ transistors in an automatic gain control circuit operating under high frequencies, some means is required for compensating for the capacitive effects or eliminating such capacitive effects from the circuit.

It is, therefore, one general object of this invention to provide an improved automatic gain control circuit for television or radio receivers.

It is another object of the present invention to provide an improved automatic gain control circuit for receivers employing a relatively high intermediate frequency which is effective in preventing distortion therein.

It is a further object of the present invention to provide a wide range automatic gain control circuit utilizing a transistor as an impedance converter.

These and other objects of the present invention will be more fully realized and understood from the following detailed description when taken in conjunction with the accompanying drawings wherein.

Like reference numerals throughout the various views of the drawings are intended to designate the same or similar structures.

Figure 1:
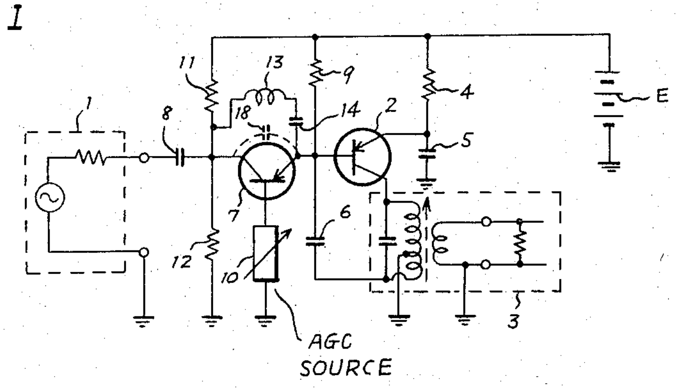
FIGURE 1 illustrates one preferred embodiment of an automatic gain control circuit of a transistor amplifier circuit according to the present invention.

With reference to the drawings, and in particular to FIGURE 1, there is shown one preferred form of the automatic gain control circuit of the present invention. A signal source 1, for example, an intermediate signal source, provides an input signal which is to be controlled by the automatic gain control action. An amplifier 2 in the form of a PNP-type transistor is connected in common emitter configuration for amplifying an input signal applied to a base thereof. A load generally designated with the reference numeral 3 such as an intermediate frequency transformer (IFT) is connected to an output of the amplifier 2.

In the circuit diagram illustrated in FIGURE 1, the output load 3 is connected to a collector of the transistor 2 and a voltage source E is connected through a resistor 4 to the emitter of the transistor 2. A by-pass capacitor 5 is connected between the emitter of the transistor 2 and ground potential. A neutralizing capacitor 6 is connected between the base of the transistor 2 and the output load 3.

To obtain attenuation of the input signal between the signal source 1 and the amplifier, a PNP-type transistor 7 connected in common base configuration is employed in the present exemplification. A coupling capacitor 8 is connected between an output end of the signal source 1 and a collector of the transistor 7. The voltage source E is connected to the emitter of the transistor 7 through a resistor 9 and to the collector through a resistance 11. An AGC source 10 of positive polarity is connected between the base of the transistor 7 and the ground potential and a resistor 12 is connected between the collector and ground potential. The resistors 11 and 12 provide a voltage dividing network for setting one operating point of the transistor 7. The AGC source 10 is representative of an AGC voltage which is achieved by any of the known structures available in the art.

In this configuration, the transistor 7 is controlled in accordance with the AGC voltage of source 10 to provide attenuation of the input signal between the input signal source 1 and the amplifier 2. This control is achieved by varying the impedance between the collector and the emitter of the transistor 7. Since the source 10 varies in accordance with variations of the input signal or, correspondingly, with variations in the output signal, the transistor 7 will perform to attenuate such changes and provide a constant output at the load 3.

Figure 2:
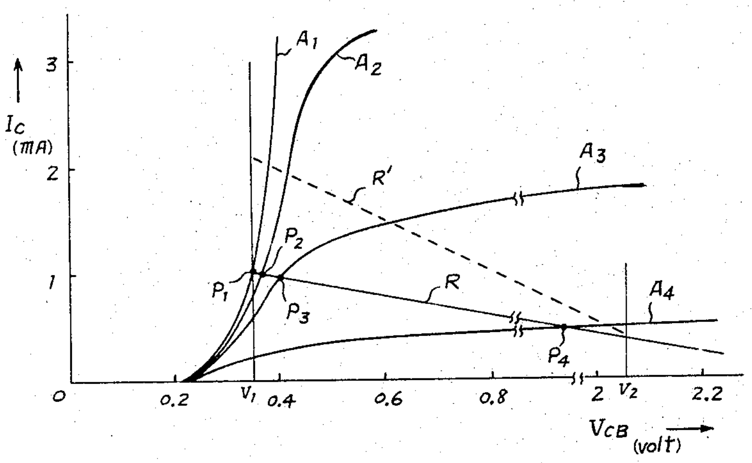
FIGURE 2 is a graph illustrating the relationship between collector-base voltage $V_{CB}$ and the collector current $I_C$ of the signal controlling transistor.

FIGURE 2 illustrates a graph of the relationship between the collector base voltage $V_{CB}$ and collector current $I_C$ of the transistor 7 having base current $I_B$ thereof as a parameter. Therefore, curves $A_1$ to $A_4$ illustrate the relationship existing for different values of base current $I_B$ of the transistor 7. A curve R is a load line of the resistor 9 and is predetermined to intersect the curves $A_1$ to $A_4$ at their respective linear portions within a range between voltages $V_1$ to $V_2$. A second curve R′ is illustrated as intersecting the curves $A_1$ to $A_4$ at their respective nonlinear portions which would be undesirable for the present invention.

In accordance with these characteristics, the base current $I_B$ decreases in accordance with an increase of voltage from $V_1$ to $V_2$ corresponding to a change in the AGC voltage, so that the transistor 7 has an impedance between its collector and emitter which corresponds to intersecting points $P_1$, $P_2$, $P_3$ and $P_4$ of the curves $A_1$, $A_2$, $A_3$, and $A_4$ respectively and the road line curve R. Therefore, it can be understood that the transistor 7 is an impedance converter or variable attenuator depending upon the AGC voltage. Since the impedance of the transistor 7 may be converted to 40 ohms at small input signals and further the impedance may be converted to several 10 kilo-ohms to 100 kilo-ohms large input signals, signals to the transistor 2 may be held within the linear working range thereof. Consequently, the AGC operation can be carried out without distorting the output signal waveform obtained at the load 3.

As has been described in the foregoing, the AGC operation resulting from use of an impedance converter of a transistor has characteristics of an extremely wide range by suitably selecting the load line R. However, when the signal frequency is relatively high, the influence of an internal capacitance $C_{CE}$, shown by dotted lines in FIGURE 1 and designated with the reference numeral 18, between the collector and the emitter of the transistor 7 cannot be neglected. At the high frequencies in question, the impedance of this capacitance $C_{CE}$ begins to effect the operation of the transistor 7 and begins to perform as a coupling between the input signal source 1 and the transistor 2.

Figure 3:
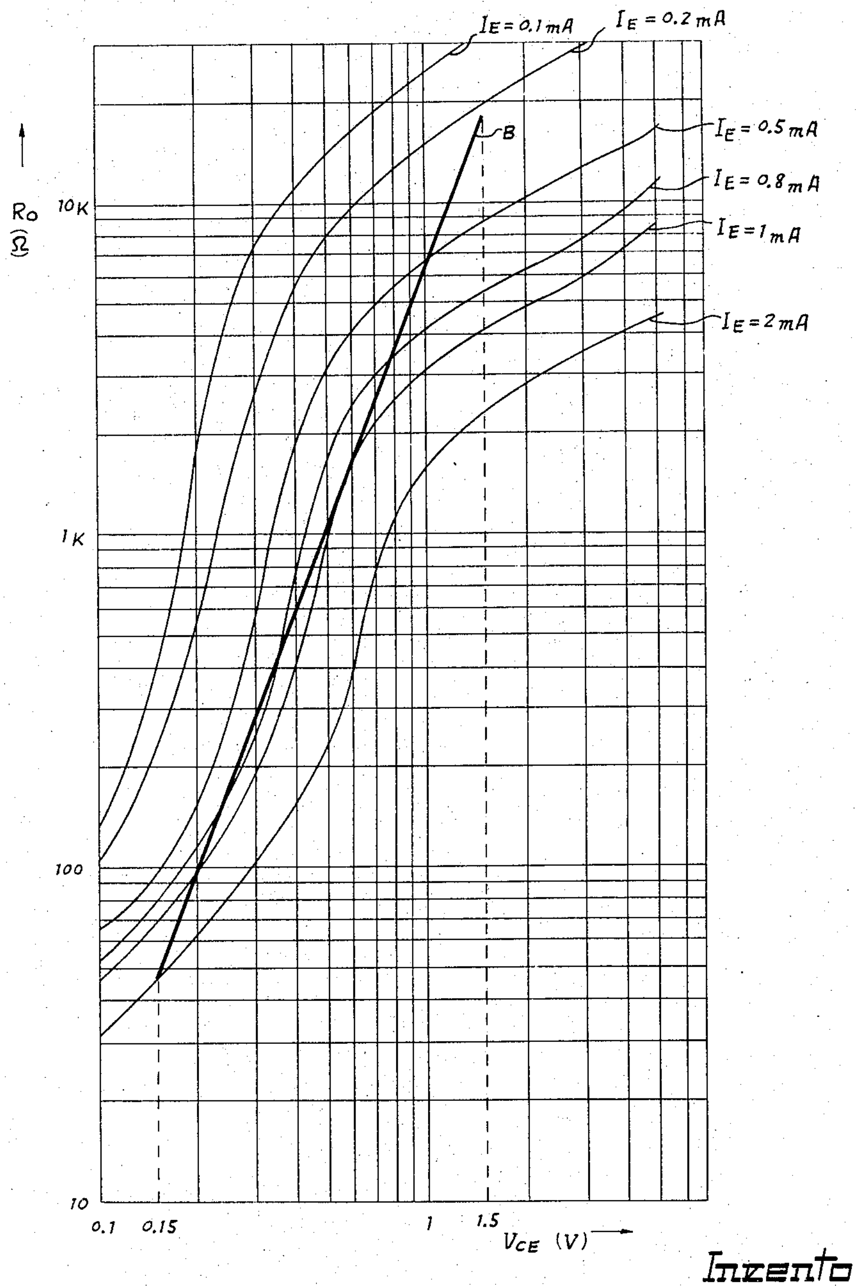
FIGURE 3 is a graph illustrating the relationship between the collector-emitter voltage and the collector-emitter impedance of the signal controlling transistor.
Figure 4:
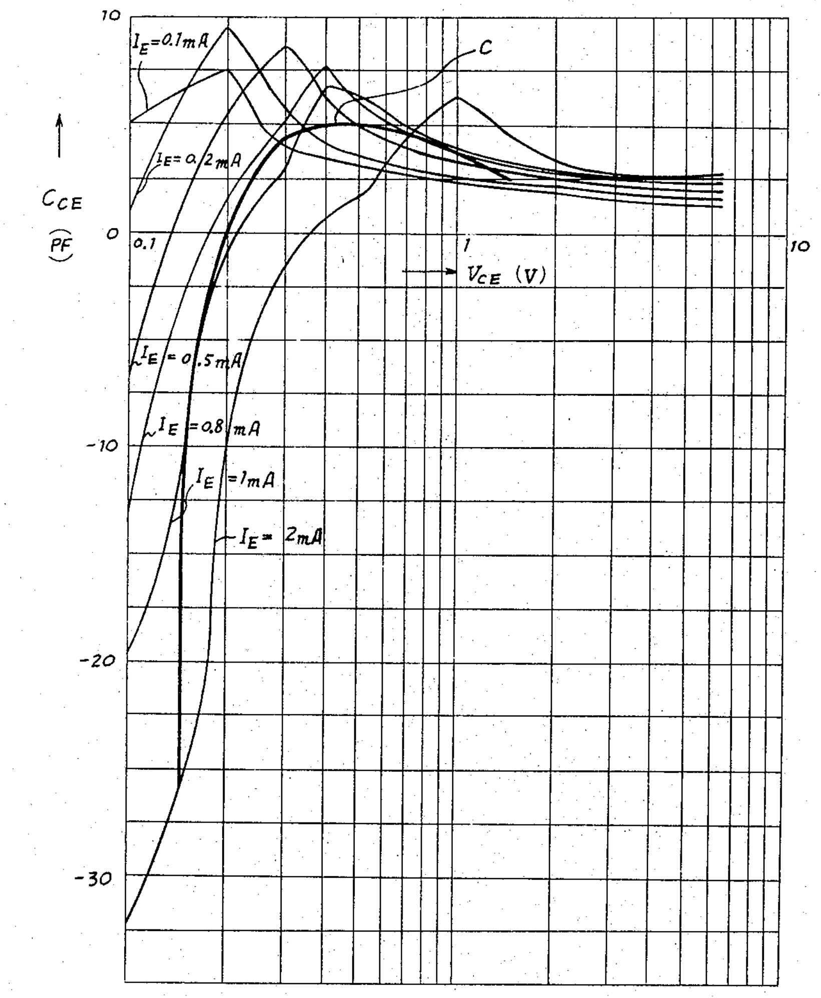
FIGURE 4 is a graph illustrating the relationship between the collector-emitter voltage and the collector-emitter capacitance of the signal controlling transistor.

The transistor 7 includes an impedance $R_0$ between the collector and emitter thereof which varies as indicated by the curve B in FIGURE 3, with an increase in an input signal which, namely an AGC voltage. On the other hand, the value $C_{CE}$ of the capacitor 18 between the collector and emitter of the transistor 7 varies as shown by the curve C in FIGURE 4 when the collector-emitter voltage $V_{CE}$ increases. (In FIGURE 4, negative values express inductive components in the form of a capacitive component.) Therefore, if an input signal frequency is 24 mc. when $V_{CE}$ is 1.5 volts, the impedance of the capacitor 18 equals approximately 2.57K ohms, since the capacitance of the capacitor 18 is approximately 2.6 picofarads as illustrated in FIGURE 4. It will be observed, however, that the value of $R_0$ for such parameters equals approximately 18K ohms as shown in FIGURE 3.

According to such conditions, therefore, the majority of the input signals will be supplied or coupled directly to the base of the amplifying transistor 2 to the capacitor 18 rather than passing through the internal resistance of the transistor 7. Such a condition exists, since the capacitance 18 is effectively connected in parallel with the internal resistance of the transistor 7. Therefore, when the input signal frequency is relatively high, the impedance of the capacitor 18 decreases to such an extent as not to be negligible and the amount of the input signal impressed to the capacitor 18 to the base of the amplifying transistor 2 thereby increases and accordingly the AGC operation rapidly decreases. This condition exists regardless of the level of the AGC source 10 attempting to attenuate the input signals by increasing the internal impedance $R_0$ between the collector and emitter of the transistor 7. That is, if the level of the input signal increases, the AGC source 10 will change accordingly to increase the impedance $R_0$ between the collector and emitter of the transistor 7 to attenuate the increased level of the input signal. The capacitor 18, however, being of a low impedance value, bypasses the internal impedance of the transistor 7 and couples the increased input signal directly to the base of the amplifying transistor 2. Therefore, the output waveform cannot be maintained at a constant level.

Accordingly, this invention intends to provide an effective AGC action by eliminating the effect realized by the influence of the capacitor 18 of the transistor 7 for impedance conversion use. To this end, a series circuit of an inductor 13 and a blocking capacitor 14 for DC current is connected between the collector and the emitter of the transistor 7 for impedance conversion use as illustrated in FIGURE 1. The series circuit including the inductor 13 and capacitor 14 are connected in parallel with the capacitor 18 and constitute a parallel resonant circuit with respect to an input signal frequency. For example, where the input signal frequency (IF) is 26.75 mc. and the capacitance $C_{CE}$ of the capacitor 18 is 3 to 4 picofarads, the inductance of the inductor 13 is 12 microhenrys and the capacitance of the blocking capacitor 14 for DC current is 0.01 microfarad. Such a combination of structure of the parallel resonant circuit provides a substantially infinite impedance to the input signal. Thus, the input signal is blocked from passing to the capacitor 18 and is effected by an AGC voltage controlling the internal resistance of the transistor 7.

Figure 5:
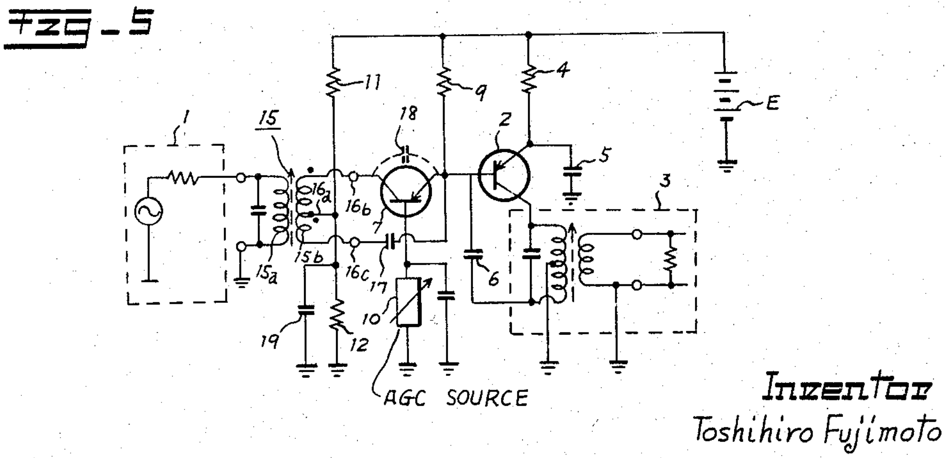
FIGURE 5 is a second embodiment of the present invention.

The embodiment illustrated in FIGURE 5 provides for making the capacitance $C_{CE}$ of the capacitor 18 independent of the frequency of the input signal. A coupling transformer 15 is employed at the output of the signal source instead of the coupling capacitor 8 as shown in FIGURE 1. A primary winding 15*a* of the coupling transformer 15 is connected to the signal source 1 and an intermediate terminal 16*a* of a secondary winding 15*b* is connected to the connecting point between the resistors 11 and 12. One end 16*b* of the secondary winding 15*b* is connected to the collector of the transistor 7 and the other end 16*c* is connected to the emitter of the transistor 7 through a neutralizing capacitor 17. This structure provides a pair of input signals of opposite phase to one another at the input of the amplifying transistor 2. The neutralizing capacitor 17 corresponds to the capacitor 18 and its value C can be selected as follows:

$$C=\frac{L_2}{L_1}C_{CE}$$

where $L_1$ and $L_2$ are inductances respectively between the terminals 16*a* and 16*b* and between the terminals 16*a* and 16*c*.

Thus, the one input signal reaches the emitter of a transistor 7 through the capacitor 18, while the other input signal reaches the emitter through the neutralizing capacitor 17, and these two signals cancel one another. The intermediate terminal 16*a* of the secondary winding 15*b* is grounded through a by-pass capacitor 19 with respect to alternating currents. Then, the input signal appearing in the emitter of the transistor 7 through the capacitor 17 is the same in amplitude as that through the capacitor 18 and they are in opposite phase to one another, thereby cancelling one another. With such structures, since the neutralizing effect is independent of the signal frequency, the capacitor 18 can be neglected and extremely favorable AGC effect can be performed.

Figure 6:
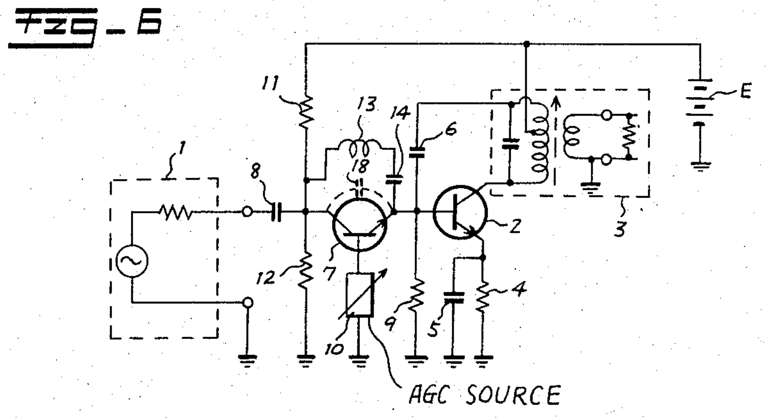
FIGURE 6 illustrates an alternate form of the embodiment shown in FIGURE 1.
Figure 7:
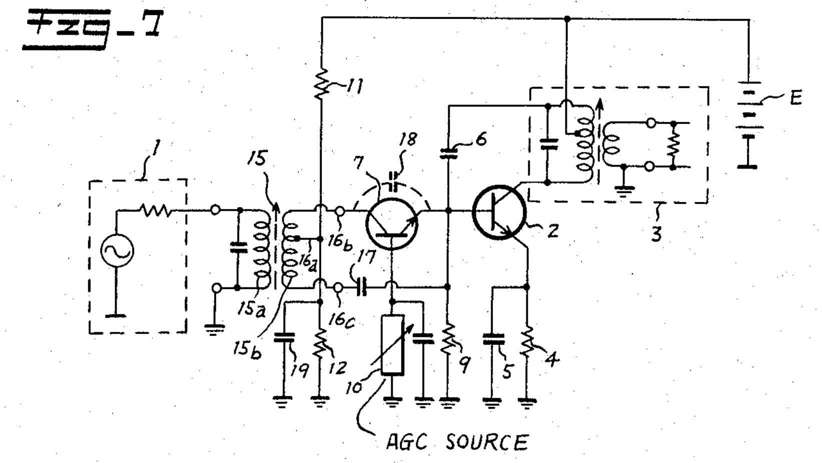
FIGURE 7 illustrates a second form of the present invention shown in FIGURE 5.

In the foregoing, the transistors 2 and 7 are PNP-type transistors, but when NPN-type transistors are used, a negative power source is employed as the AGC power source 10. The circuits in this case are illustrated in FIGURES 6 and 7 and parts corresponding to those in FIGURES 1 and 5 are marked with the same reference numerals and their detailed explanation will be omitted for the sake of simplicity. It is to be understood, however, that their operations and effects are, of course, substantially the same as in the foregoing examples.

Figure 8:
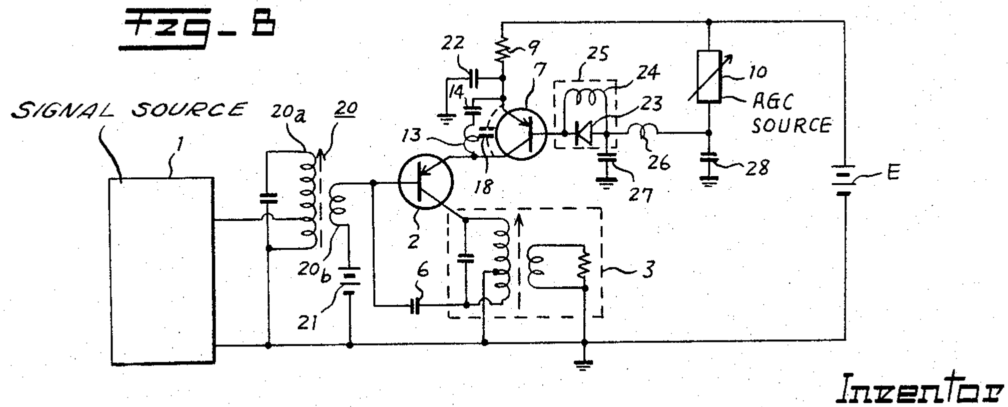
FIGURE 8 illustrates still another embodiment of the present invention.

Still another embodiment of the present invention is illustrated in FIGURE 8 wherein a transistor for impedance conversion purposes is connected in series to the emitter of the amplifying transistor and an AGC voltage is thereby supplied thereto to effectively carry out an AGC action similar to the previously described embodiments. Also in this embodiment, if the influence of the capacitance between the collector and the emitter of the transistor 7 for impedance conversion use is removed, the AGC operation can be performed over a wide range without distortion to the output waveform. Therefore, the signal source 1 is connected to a coupling transformer 20 having one end of the secondary winding 20*b* connected to the base of the transistor 2 and the other end connected through a power source 21 to ground potential. The power source 21 provides base biasing for the transistor 2. The load 3 is connected between the collector of the transistor 2 and ground potential.

In the exemplification of FIGURE 8, the impedance converting transistor 7 is of the same continuity type of that of the transistor 2. The collector of the transistor 7 is connected to the emitter of the transistor 2. Therefore, the emitter-collector circuit of the transistor 2 and the emitter-collector circuit of the transistor 7 are series connected with one another. The emitter of the transistor 7 is connected through a resistor 9 to the power source E, and is also connected to ground potential through a bypass capacitor 22. A parallel circuit 25 including a diode 23 and an inductor 24 is connected at one end thereof to the base of the transistor 7 and at the other end thereof to the AGC power source 10 through an inductor 26 for filtering. Filtering capacitors 27 and 28 are each connected between the respective ends of the inductor 26 and ground potential.

In this embodiment, it is preferable to connect the diode 23 in such a manner that the polarity thereof may be in a reversed direction to that of the base and emitter of the transistor 7. Therefore, the impedance between the collector and emitter of the transistor 7 vary with the voltage of the AGC power source 10 and hence the biasing voltage of the emitter of the transistor 2 varies to carry out an effective AGC action. In addition, the series circuit including the inductor 13 and the blocking capacitor 14 for DC current is connected between the collector and the emitter of the transistor 7 and in parallel with the capacitor 18. This parallel circuit arrangement provides a parallel resonant circuit with respect to the signal frequency. Consequently, the influence of the capacitor 18 is removed in a favorable AGC action as carried out.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. In combination with an amplifier circuit having a signal source connected thereto and including an amplifying transistor with an emitter and a collector thereof connected in series with an output load, an automatic gain control circuit, comprising (a) a control transistor having an emitter and a collector connected in series between the signal source and a base of the amplifying transistor, (b) an automatic gain control source connected to a base of said control transistor, and (c) means connected to said gain control transistor for controlling the value of the emitter-collector capacitance thereof including an inductance connected between the emitter and collector of said control transistor and forming a resonant circuit with the emitter-collector capacitance thereof at the frequency of the signal source.

2. In combination with an amplifier circuit having a signal source including a transformer winding connected thereto and including an amplifying transistor with an emitter and a collector thereof connected in series with an output load, an automatic gain control circuit, comprising (a) a control transistor having an emitter and a collector connected in series between one end of the transformer winding and a base of the amplifying transistor, (b) an automatic gain control source connected to a base of said control transistor, and (c) means connected to said gain control transistor for controlling the value of the emitter-collector capacitance thereof and including a capacitor connected from the other end of the transformer winding to the base of the amplifying transistor.

References Cited

UNITED STATES PATENTS

| | | | |
|---|---|---|---|
| 2,937,341 | 5/1960 | Aram | 330—145 X |
| 3,002,090 | 9/1961 | Hirsch | 325—413 X |
| 3,013,148 | 12/1961 | De Long et al. | |
| 3,090,027 | 5/1963 | Minner | 330—29 |
| 3,289,088 | 11/1966 | Berger | 330—135 X |

FOREIGN PATENTS

| | | |
|---|---|---|
| 764,428 | 12/1956 | Great Britain. |
| 835,337 | 5/1960 | Great Britain. |

ROY LAKE, *Primary Examiner.*

J. B. MULLINS, *Assistant Examiner.*